United States Patent [19]

Bogut

[11] 4,006,396
[45] Feb. 1, 1977

[54] UNIVERSAL BATTERY CHARGING APPARATUS

[75] Inventor: Henry A. Bogut, Coral Springs, Fla.
[73] Assignee: Motorola, Inc., Schaumburg, Ill.
[22] Filed: Mar. 5, 1975
[21] Appl. No.: 555,476

Related U.S. Application Data

[63] Continuation-in-part of Ser. No. 434,526, Jan. 18, 1974, abandoned.

[52] U.S. Cl. .................................. 320/2; 320/22; 320/35; 320/37
[51] Int. Cl.² ........................................ H02J 7/00
[58] Field of Search ............................. 320/20–24, 320/39, 40, 35, 36, 32, 2, 37, 38

[56] References Cited
UNITED STATES PATENTS

| | | | |
|---|---|---|---|
| 3,382,425 | 5/1968 | Legatti | 320/32 |
| 3,667,026 | 5/1972 | Bogut et al. | 320/36 |
| 3,767,995 | 10/1973 | Kaminski et al. | 320/22 |

*Primary Examiner*—Robert J. Hickey
*Attorney, Agent, or Firm*—Donald B. Southard; Eugene A. Parsons; James W. Gillman

[57] ABSTRACT

Battery charging apparatus for charging batteries having different optimum charging rates, and wherein there is included in the same housing with the battery an electrical element having a characteristic related to a predetermined charging rate of the battery. Terminals are provided on the housing for the battery and the electrical element, for connection to the charging apparatus, and the charging apparatus utilizes the value of the characteristic of the element to control the supply of charging current to the battery. The electrical element provided with the battery may be a resistor, and the charging apparatus connects the resistor in a circuit to develop a control potential which is utilized to control the charging current. This control potential operates through a regulator to control the current through a resistance which is connected to the base of a transistor which controls the charging current. The current through the resistance controls the potential developed thereacross to provide a control potential at the base of the transistor to thereby control the charging current. An improved timer including four IC comparators may be utilized to control the length of time charging current is applied to the battery. Also, if the battery includes a heat sensitive element, such as a thermistor, circuitry is provided for sensing the presence and value of the thermistor and supplying a suitable rapid charge current to the battery. A pair of light emitting diodes are connected to the charging circuit to indicate when charging current is supplied to the battery.

20 Claims, 4 Drawing Figures

UNIVERSAL BATTERY CHARGING APPARATUS

CROSS REFERENCES TO RELATED APPLICATIONS

This application is a continuation-in-part of application Ser. No. 434,526, filed Jan. 18, 1974, now abandoned.

BACKGROUND OF THE INVENTION

1. FIELD OF THE INVENTION

Portable electrical apparatus, including batteries for energizing the same, are used in many applications. These batteries may be rechargeable batteries, such as nickel cadmium batteries, so that they can be recharged rather than be replaced, and thereby a substantial cost saving is achieved. Some users of battery energized equipment may have need for batteries having substantially different capacities, and to properly charge batteries different charging rates should be used. A substantial cost and space saving is realized by providing a universal charging apparatus for charging the different batteries which require different charging rates. However, to accomplish this, it is necessary to provide control of the charging rate and to further provide timed and rapid charge functions. To provide this control, it is necessary to have information as to the required charging rate for the different batteries so that the proper charging rate can be set in the charging apparatus. It is desirable that the charging rate be automatically set for the battery which is to be charged, to prevent incorrect charging and minimize human error.

2. DESCRIPTION OF THE PRIOR ART

Prior art charging apparatus do not have the ability to sense the different required charging rates for batteries having different capacities and supply predetermined charging currents closely approximating the various required charging rates to the batteries. U.S. Pat. No. 3,767,995, entitled "Automatic Battery Charging Circuit Operable Over a Wide Temperature Range" for example, discloses apparatus for charging a battery at a first rate if there is no thermistor associated with the battery and at a second rate if a thermistor is present. However, there is no circuitry for automatically altering these charging rates for charging batteries with different capacities.

SUMMARY OF THE INVENTION

It is an object of the present invention to provide battery charging apparatus for use with batteries of varying capacities requiring different charging rates, which cooperates with an electrical element associated with the battery to control the charging current supplied to the battery.

Another object is to provide universal battery charging apparatus for use with batteries wherein electrical elements are included in the housing with the battery which have values related to the optimum charging rate and the temperature of the battery, and wherein the charging apparatus is connected to the battery and the elements and controls the charging rate in accordance with some characteristics of the elements.

A further object of the invention is to provide a universal battery charging device which includes a diode in the charging path, and a switch connected across the diode and operated by the voltage drop thereacross when charging current flows, and an indicator operated by the switch to indicate when charging current is being supplied to the battery.

A still further object of the invention is to provide an improved universal battery charging apparatus for use with a battery having a resistor packaged therewith, with the value of the resistor being related to a predetermined optimum charging rate of the battery, and wherein the resistor is connected in a circuit which provides a control voltage for controlling the supply of current to the battery to charge the same, so that the charging current applied to the battery is approximately the optimum charging current.

Still another object of the invention is to provide an improved universal charging device which includes a transistor for controlling the charging current supplied to the battery, a regulator for controlling the current flow through resistance means, which includes a control circuit adapted to be connected to a resistor provided with the battery to control the regulator in accordance with the value of the resistor, with the potential developed across the resistance means controlling the transistor to thereby control the charging current and an improved timer for controlling the length of time the charging current is applied to the battery.

Still another object of the invention is to provide an improved universal charging device which provides predetermined rapid charge currents to batteries of different capacities including temperature sensitive elements therewith.

In practicing the invention, a universal battery charging device is provided which is suitable for charging a variety of different batteries having different optimum charging rates. A resistor is provided in the same housing with the battery, and has a value related to a predetermined charging rate of the battery with which it is associated. A thermistor may also be included in the housing for rapid charging the battery. The charging apparatus has a receptacle for receiving the battery housing, with connectors therein which make connection with terminals on the housing that are connected to the battery and to the resistor and the thermistor. A charging current supply circuit is provided which includes a transistor for controlling the charging current therethrough. The conduction of the transistor is controlled by a circuit which is connected to the resistor in the battery, and the current supplied to charge the battery has a predetermined relation to the value of the resistor.

The circuit for controlling the supply transistor may include an integrated circuit regulator which controls the current supplied through resistance means in accordance with a control voltage applied thereto. The control voltage is provided by a control circuit to which the resistor associated with the battery is connected, and the value of the control voltage is related to the value of the resistor. The current through the resistance means provides a voltage thereacross which is applied to the transistor to control its conduction and the charging current supplied therethrough. The charging circuit includes a diode across which a voltage drop is developed when charging current flows therethrough. A transistor has its base-to-emitter junction connected across the diode, and its collector connected in circuit with a light emitting diode, so that when current flows through the charging path the transistor is rendered conducting by the voltage drop across the diode, and the light emitting diode indicates that charging current is flowing to the battery. A timing circuit is provided for reducing the charging current to a trickle rate after a predetermined period of time. A rapid charge circuit senses the presence and value of a thermistor in the battery and supplies a predetermined rapid charge current to the battery until a rise in temperature indicates the battery is fully charged.

DETAILED DESCRIPTION

Figure 1:
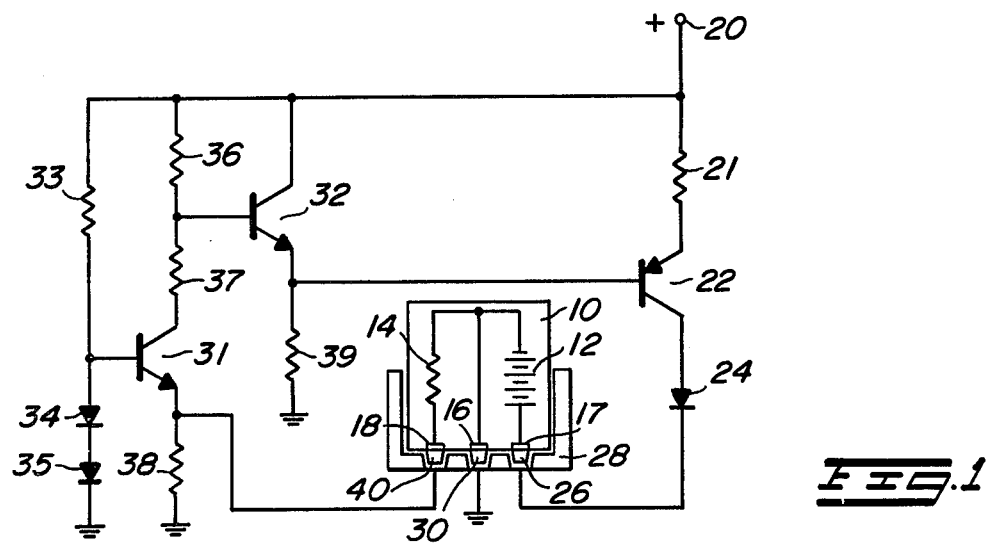
FIG. 1 is a circuit diagram of one embodiment of the universal battery charging apparatus of the invention connected to a battery for charging the same.

In FIG. 1 of the drawing there is shown a battery housing 10 which includes a battery proper 12 provided in the same housing with a resistor 14. Three terminals are provided on the battery housing 10, terminal 16 which is common to the battery 12 and the resistor 14, terminal 17 which is connected to the battery, and terminal 18 which is connected to the resistor. The resistor 14 is selected to have a value which is related to the proper or optimum charge current which should be applied to charge the battery. Although a resistor is illustrated and will be described, it will be apparent that some other electrical element might be used which has a value selected so that it is related to the optimum charging rate for the battery.

A direct current supply potential is applied at terminal 20 of the circuit, which is connected through resistor 21 to the emitter electrode of transistor 22, and which has a collector electrode connected through diode 24 to the terminal 26 of receptacle 28. Accordingly, the transistor 22 controls the current supplied from the current supply point 20 to the battery 12 to charge the same. The circuit to the battery is completed through the ground connection provided by terminal 30 of the receptacle 28. The conduction of transistor 22 is controlled by the potential applied to the base thereof, to thereby control the charging current.

The circuit for controlling the potential applied to the base of transistor 22 includes transistors 31 and 32. The voltage divider string including resistor 33 and diodes 34 and 35, which are connected between the supply point 20 and ground, applies a potential to the base of transistor 31 to bias the same. The collector of transistor 31 is connected to the supply point 20 through series connected resistors 36 and 37, and the emitter is connected to ground through resistor 38. The potential at the junction between resistors 36 and 37 is applied to the base of transistor 32, the collector of which is connected to the potential at the supply point 20, and the emitter is connected to ground by resistor 39. The current through transistor 31 controls the bias applied to the base of transistor 32, to thereby control the conduction thereof. The emitter of transistor 32 in turn controls the bias applied to the base of transistor 22, to control the charging current applied to the battery 12.

The resistor 14 provided in the battery housing 10 is connected to the control circuit including transistors 31 and 32 to control the charging current. The emitter of transistor 31 is connected to terminal 40 of receptacle 28, which engages terminal 18 of the battery housing, to thereby connect resistor 14 in the battery in parallel with resistor 38. Accordingly, the resistor 14 in the battery controls the resistance in the emitter-collector circuit of transistor 31, to thereby control the potential applied by this circuit to the base of transistor 32. By providing resistors of different values in the battery housing, the potential applied to transistor 32 is changed, and the potential applied to the base of transistor 22 is likewise changed to change the charging current supplied to the battery. The charging circuit therefore can provide predetermined charging currents which are approximately the optimum charging currents for batteries of different capacities automatically in accordance with the values of the resistors provided in the housings with the batteries.

Figure 2:
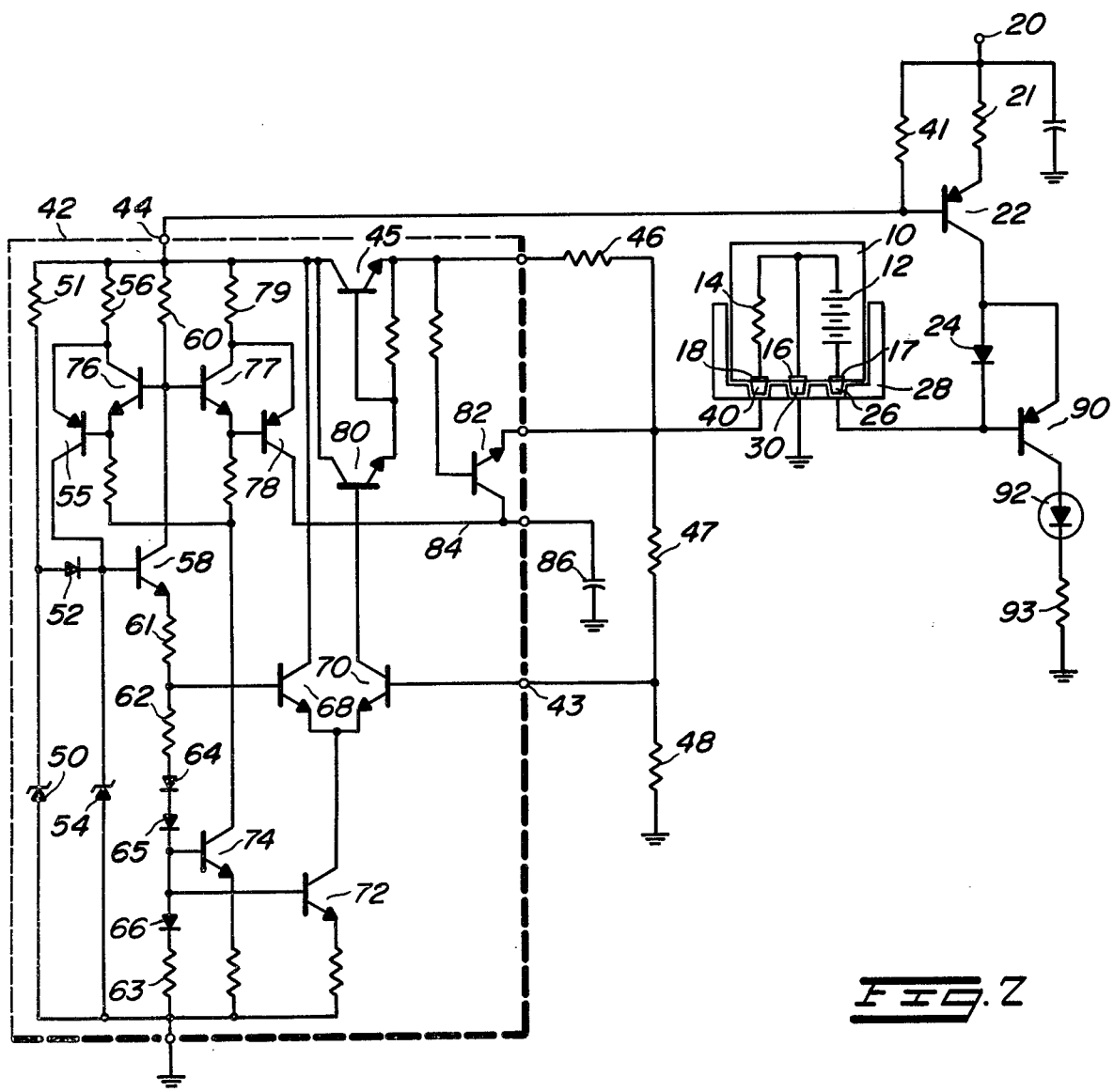
FIG. 2 is a circuit diagram of another embodiment of the charging apparatus of the invention.

In FIG. 2 there is shown a second embodiment of the universal battery charging apparatus of the invention, in which the control circuit for the charging system is provided to a large extent by a commercially available integrated circuit. In the system of FIG. 2, the battery 10 and the receptacle 28 for receiving the same, and the circuit including transistor 22 for supplying charging current to the battery are the same as in FIG. 1, and these elements have been given the same reference numerals as in FIG. 1.

In the circuit of FIG. 2, a resistor 41 is connected from the supply point 20 to the terminal 44 of the integrated circuit 42. The integrated circuit 42 controls the current through resistor 41, which controls the potential thereacross. This potential is applied to the base of transistor 22 to control the conductivity thereof to control the charging current supplied to the battery through diode 24 and the terminal 26 of receptacle 28 to the terminal 17 on the battery housing 10.

The integrated circuit 42 functions as a current regulator to control the current through resistor 41. The integrated circuit 42 may be a standard monolithic or integrated circuit, and may be type MFC 6030A integrated circuit provided by Motorola, Inc. and sold by Motorola Semiconductor Products, Inc., Phoenix, Arizona. The current through the regulator 42 is controlled by the potential applied at control terminal 43 thereof. This potential is controlled by the circuit extending from supply potential point 44 through the collector-emitter path of transistor 45 of the regulator, and through resistor 46, resistor 47 and resistor 48 which are external to the regulator 42. The common junction of resistors 46 and 47 is connected to terminal 40 provided in the receptacle 28, for connection through terminal 18 of the battery housing 10 to the resistor 14 therein. Accordingly, the resistor 14 is connected in parallel with resistors 47 and 48 to ground, and the value of resistor 14 affects the current supplied through resistors 47 and 48 and the potential across resistor 48, which is applied to the control terminal 43 of the regulator.

Briefly describing the regulator, it includes a first zener diode 50 connected to the supply terminal 44 by resistor 51. The voltage across zener diode 50 is applied through diode 52 to the zener diode 54, which is also connected by supply transistor 55 and resistor 56 to the current supply terminal 44. The potential across zener diode 54 provides a very closely regulated potential at the base of transistor 58, which in turn controls the current supplied through the voltage divider string including resistors 60, 61, 62, 63 and diodes 64, 65 and 66. The potential in this string at the junction between resistors 61 and 62 is applied to the base of transistor 68, which together with transistor 70 forms a differential amplifier. Transistor 72 forms the current source for the differential amplifier, and the potential applied to the base of this transistor is controlled by the potential at the junction between the diodes 65 and 66 of the potential at the junction between the diodes 65 and 66 of the divider string which was previously mentioned. This same potential is applied to the current source transistor 74 which controls the current through transistors 76 and 77.

Transistor 76 provides a fixed bias to control the conduction of transistor 55 which supplies the zener diode 54, as previously described. Transistor 77 controls the current through transistor 78 which is connected in series with resistor 79 from the current supply terminal 44 to the collector of transistor 70 of the differential amplifier. The collector of transistor 68 of the differential amplifier is directly connected to the current supply terminal 44, and the transistors 68 and 70 conduct in accordance with the reference potential applied to the base of transistor 68 and the control potential applied from terminal 43 to the base of transistor 70. The collector of transistor 70 is connected to the base of transistor 80, which is coupled to the pass transistor 45 to form a Darlington pair. The differential amplifier, therefore, acts through transistor 80 to control the conduction of the pass transistor 45.

Also connected to the collector of differential amplifier transistor 70 is transistor 82 which has its emitter connected to the junction between resistors 46 and 47. When an excessive voltage drop occurs across resistor 46 because of heavy current therethrough, the transistor 82 will conduct to lower the potential on conductor 84 which controls the conduction of transistor 80. This provides limiting action in the regulator 42. An external capacitor 86 bypasses conductor 84.

As previously stated, the potential at control point 43 controls the current through the circuit 42, and this action takes place by controlling the conduction of transistor 70 of the differential amplifier to control the potential at point 84. This controls transistor 80 to in turn control pass transistor 45 to control the current through resistor 46. Accordingly, the regulator 42 controls the current from the supply point 20 through resistor 41 of the charging circuit to the supply terminal 44 of the regulator 42.

Inasmuch as resistor 14, within the battery housing 10, is in parallel with resistors 47 and 48, the value of this resistor will control the division of the current between resistor 14 and resistors 47 and 48, to thereby control the potential across resistor 48 which is applied to terminal 43. The transistor 82 provides current limiting action so that if excessive current flows through resistor 46, the potential at conductor 84 will be pulled toward ground to reduce the potential applied to the base of transistor 80, and thereby reduce the conductivity of the pass transistor 45.

It will, therefore, be seen that when a battery housing is placed in the receptacle 18 which has terminals engaging the conductors 26, 30 and 40 in the receptacle, the current supplied through resistor 41 of the charging circuit will depend upon the valve of the resistor 14 provided with the battery. This will control the conduction of transistor 22 to, in turn, control the charging current supplied to the battery 12.

In order to indicate when charging current is being supplied to the battery, transistor 90 is coupled to the diode 24 provided in the series circuit through which charging current is supplied. Transistor 90 has its base and emitter electrodes connected across the diode 24, so that transistor 90 is rendered conducting when charging current flows through the diode 24 to provide a voltage drop thereacross. A light emitting diode 92 is connected to the collector of transistor 90 and through resistor 93 to ground. When transistor 90 conducts, current will flow through the diode 92 so that it will emit light to indicate that charging current is being supplied to the battery in the receptacle 18.

Figure 3:
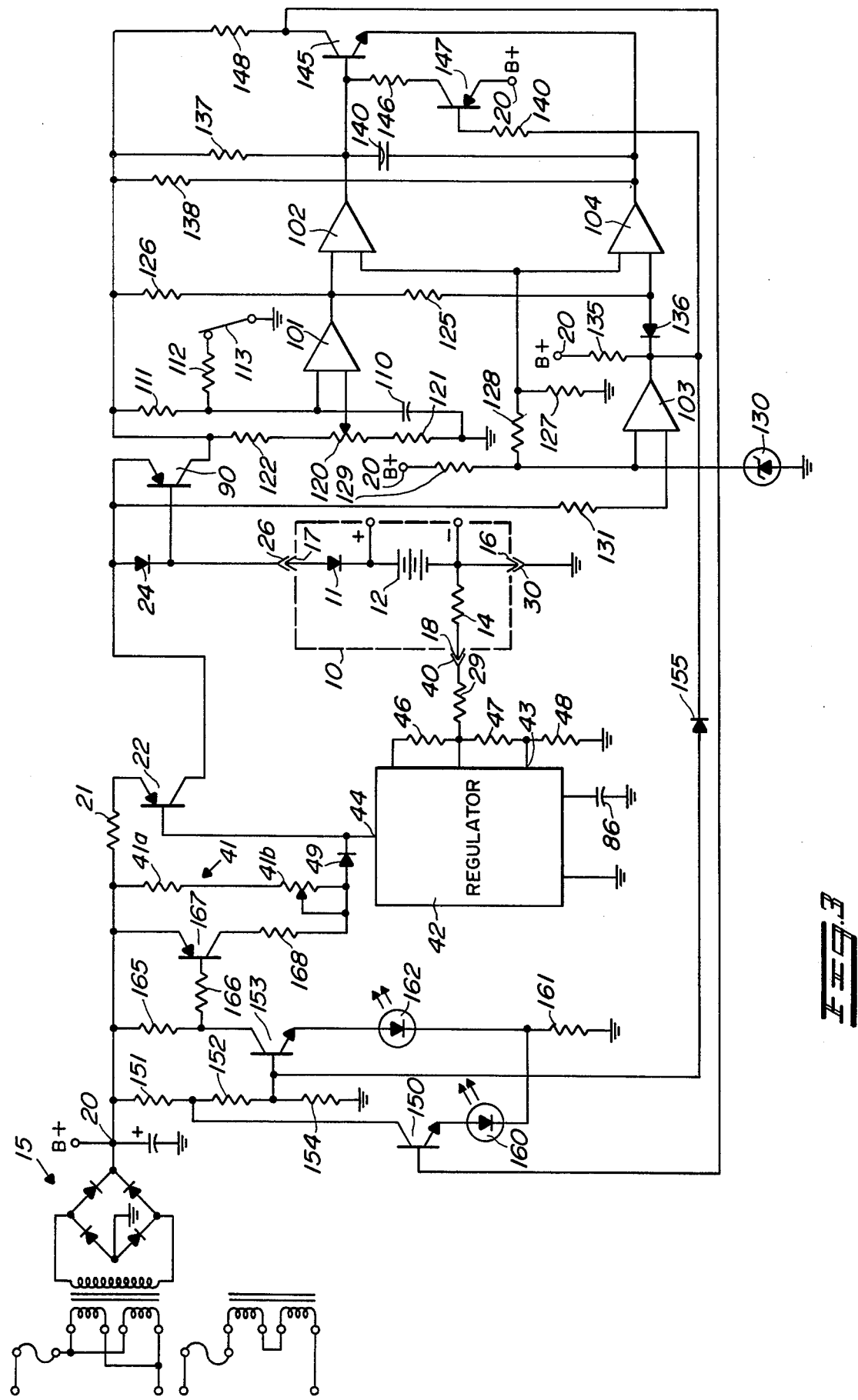
FIG. 3 is a circuit diagram similar to FIG. 2, including timing apparatus.

FIG. 3 illustrates a universal battery charging apparatus similar to that illustrated in FIG. 2 with timing circuitry added to automatically provide a charging current for a predetermined period of time. The components illustrated in FIG. 3 which are similar to those illustrated in FIG. 2 have been designated with a similar number so that a comparison between circuits can readily be made. A full wave rectified power supply, generally designated 15, is attached to the supply point 20 to provide B+ to the circuitry. The electrical element, resistor 14, in battery housing 10 is connected to the junction of resistors 46 and 47, connected externally to regulator 42 as described in conjunction with FIG. 2, by means of a resistor 29 and the regulator 42 is connected to the supply point 20 through a resistor 41 which controls the conduction of a transistor 22. In the present embodiment the resistor 41 includes a fixed resistor 41a and a variable resistor 41b, which provides an adjustment to compensate for variations in the circuit and ambient conditions. A diode 49 is placed in series with the resistor 41 and regulator 42 to prevent damage from occurring to the circuit in the event the supply 15 is connected in a reverse direction and provide temperature compensation for transistor 22. Also, in the present embodiment a diode 11 is illustrated in series with the battery 10 as a safety feature to prevent charging current from being applied in a reverse direction and to prevent the battery from being accidentally discharged through contacts 17 and 16 or 18. The diode 24 in series with the battery 12 biases the transistor 90 so as to supply current to the remainder of the circuit when charging current is being applied to the battery 12.

In FIG. 3 the improved timer includes 4 integrated circuit comparators 101, 102, 103 and 104. The four comparators may be purchased commercially on a single IC chip. The negative input terminal of the comparator 101 is connected through a capacitor 110 to ground, through a resistor 111 to the collector of the transistor 90, and through a resistor 112 and a single pole switch 113 to ground. The positive input terminal of the comparator 101 is connected to the movable contact of a potentiometer 120 one end of which is connected through a resistor 121 to ground and the other end of which is connected through a resistor 122 to the collector of the transistor 90. The output of the comparator 101 is connected directly to the negative input of the comparator 102 and through a resistor 125 to the positive input of the comparator 1.4. A resistor 126 is also connected from the negative input of the comparator 102 to the collector of the transistor 90 to provide the desired bias on the comparators 1.2 and 1.4. The positive input of the comparator 1.2 is connected directly to the negative input of the comparator 104 and to the junction of a pair of series connected resistors 127 and 128. The resistor 127 is connected to ground and the resistor 128 is connected through a third series connected resistor 129 to B+ at the supply point 20. The junction of the resistors 128 and 129 is connected directly to the positive input terminal of the comparator 103 and through a zener diode 130 to ground. The negative input terminal of the comparator 103 is connected through a resistor 131 to the collector of the transistor 22, which has the charging current for the battery 12 flowing therefrom. The output of the comparator 103 is connected through a resistor 135 to B+ at the supply point 20 and through a diode 136 to the positive terminal of the comparator 104. The output terminal of the comparator 102 is connected through a resistor 137 to the collector of the transistor 90 and to the anode of a micro coulometer 140. The output terminal of the comparator 104 is connected through a resistor 138 to the collector of the transistor 90 and to the cathode of the micro coulometer 140. In addition, the output terminal of the comparator 102 is connected directly to the base of an npn type transistor 145 and through a resistor 146 to the collector of a pnp type transistor 147. The output terminal of the comparator 104 is connected directly to the emitter of the transistor 145. The collector of the transistor 145 is connected through a resistor 148 to the collector of the transistor 90 and directly to the base of an npn type transistor 150. The collector of the transistor 150 is connected to the supply point 20 through a resistor 151 and through a resistor 152 to the base of an npn type transistor 153. The base of the transistor 153 is also connected through a resistor 154 to ground and through a diode 155 to the output terminal of the comparator 103. The emitter of the transistor 150 is connected through a light emitting diode 160 and a resistor 161 to ground. The emitter of the transistor 153 is connected through a second light emitting diode 162 to the junction of the diode 160 and resistor 161. In the present embodiment the light emitting diode 160 indicates that a charging current is being applied to the battery 12 and, thus, this diode may emit a red light while the diode 162 indicates that a lower or trickle charge is being applied to the battery 12 and, thus, a green light may be emitted thereby. The collector of the transistor 153 is connected through a resistor 165 to the supply point 20 and through a resistor 166 to the base of a pnp type transistor 167. The emitter of the transistor 167 is connected directly to the supply point 20 and the collector is connected through a resistor 168 to the junction of the resistor 41b and diode 49.

In the operation of the circuit illustrated in FIG. 3, when battery housing 10 is plugged into terminals 26, 30 and 40 the transistor 22 is biased into conduction, as previously described and a predetermined charging current is applied to the battery 12. At the same time that current is applied to the battery 12 the potential at the negative input of the comparator 103 drops so that the output terminal switches from a zero or ground to a one or high. Also, the charging current flowing through the diode 24 biases the transistor 90 into conduction which applies voltage to both of the dividers connected to the negative and positive inputs of the comparator 101. It should be noted that switch 113 is automatically opened when the battery housing 10 is inserted into the charging apparatus. Initially, the capacitor 110 is completely discharged and appears essentially as ground to the negative input of the comparator 101, thus, producing a one or high at the output terminal thereof. The high at the output of comparator 103 biases transistor 147 into nonconduction and the high at the output of the comparator 101 produces a low or zero at the output of comparator 102 and a high or one at the output of comparator 104. Since the output terminal of the comparator 102 is low or near ground, current flows through the resistor 138 and the micro coulometer 140 to plate silver onto the anode thereof. As is well known to those skilled in the art, a characteristic of the micro coulometer 140 is that if there is any silver on the anode, a very low voltage is observed across it when a current is passed through the device.

With current flowing through the resistor 138 and the micro coulometer 140 to plate silver onto the anode thereof, the transistor 145 is biased off and the transistor 150 is biased on so that the light emitting diode 160 is on and emitting light waves, which in this embodiment are red, to indicate that battery 12 is being charged. When the voltage across the capacitor 110 reaches a value greater than the voltage at the movable arm of the potentiometer 120, the comparator 101 switches so that the output thereof is a low or zero. When the comparator 101 switches both of the comparators 102 and 104 switch so that the outputs thereof are high and low, respectively. A current now flows in a reverse direction through the coulometer 140 and the much larger resistor 137 to begin deplating the silver from the anode of the coulometer 140. Resistor 137 is approximately 444 times as large as the resistor 138 so that it takes 444 times as long to deplate the anode of the coulometer 140 as it took to plate it. In the present embodiment the time required for capacitor 110 to charge sufficiently to switch the comparator 101 is exactly one minute. Thus, silver is plated onto the anode of the micro coulometer 140 for one minute and 444 minutes are required to deplate the silver.

When all of the silver is deplated from the anode of the micro coulometer 140 the voltage drop thereacross increases substantially and the transistor 145 is biased into conduction. With the transistor 145 conducting and the output of the comparator 104 near ground, the transistor 150 is cut off, which causes the transistor 153 to be biased into conduction and the light emitting diode 162 is turned on indicating that the charging cycle has been completed. When the transistor 153 begins to conduct the transistor 167 is biased into conduction and a control voltage is supplied to the base of the transistor 22 which causes the transistor 22 to conduct substantially less than during the charging cycle. With transistor 22 conducting substantially less the amount of current supplied to the battery 12 is 0.1 or less the amount that is supplied during the charging cycle, which reduced current is referred to as a trickle charge in the art. Upon removal of the battery housing 10 from engagement with the terminals 26, 30 and 40, the transistors 22 and 90 are cut off and the switch 113 closes to completely discharge the capacitor 110 and prepare the charger for the next battery. If the battery housing 10 should be removed from the terminals before the charge is complete, B+ is applied to the negative input terminal of the comparator 103 so that the output terminal thereof is a low or approximately at ground. The low at the output of comparator 103 biases the transistor 147 into conduction which quickly deplates the micro coulometer 140 and prepares the battery charging apparatus for the next battery.

Figure 4:
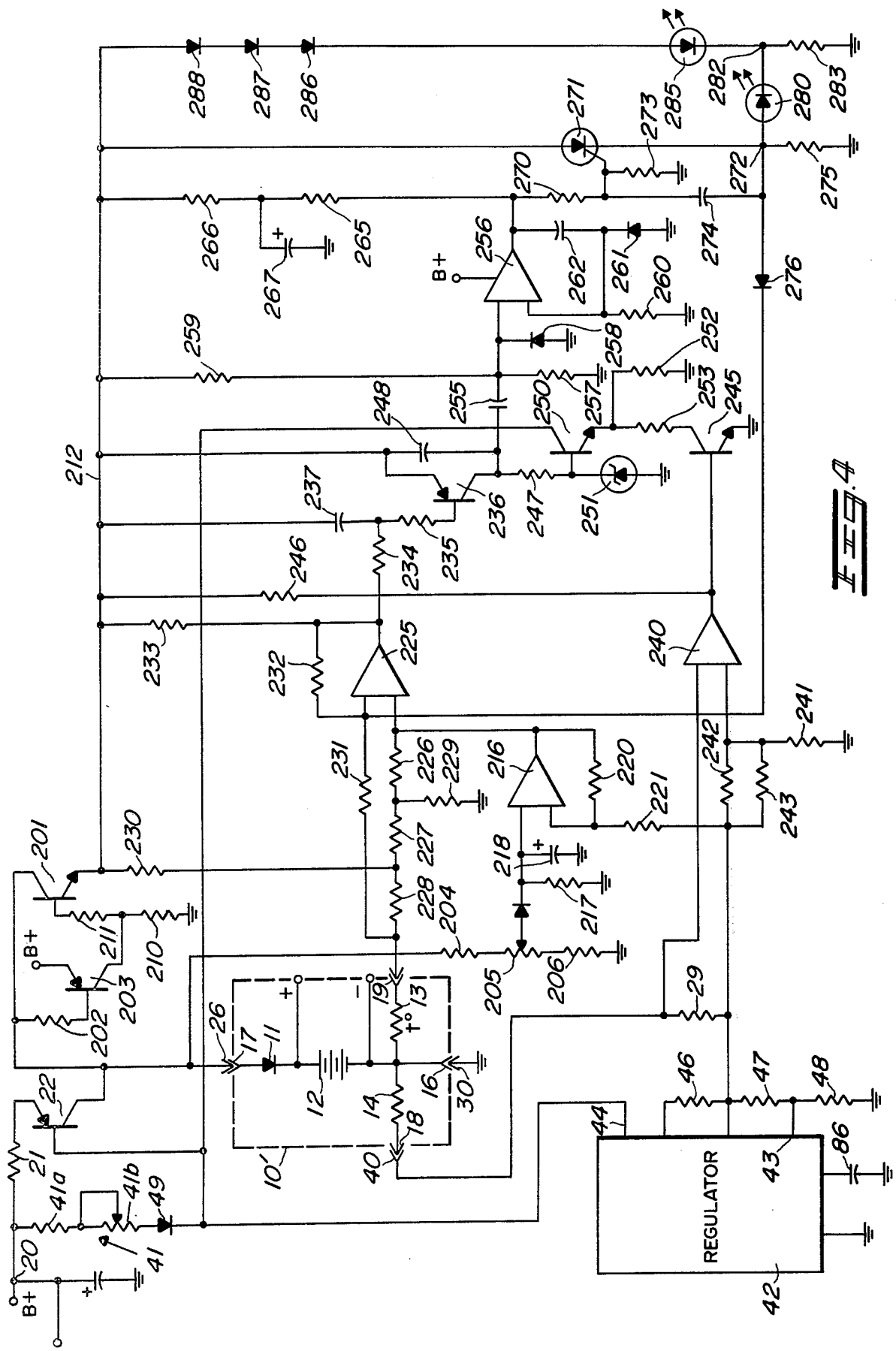
FIG. 4 is a circuit diagram similar to FIG. 2, including apparatus for supplying a rapid charge current to the battery.

Referring to FIG. 4, the regulator 42, supply point 20, current limiting transistor 22 and other components which are the same as those in FIGS. 2 and 3 have been designated with the same numbers. In this particular embodiment the battery housing 10' also contains a thermistor 13 having one side connected to ground through connectors 16 and 30 and the other side available external to the battery on a connector 19. The thermistor 13 normally has a resistance value below 200 ohms and increases to a value in excess of 800 ohms when the battery 12 is approximately fully charged.

The collector of the transistor 22, in addition to being connected to terminal 17 of the battery, is connected directly to the collector of an npn type transistor 201, through a resistor 202 to the base of a pnp type transistor 203, and through the series combination of a resistor 204, a potentiometer 205 and a resistor 206 to ground. The emitter of the transistor 203 is connected directly to the supply point 20 and the collector is connected through a resistor 210 to ground and through a resistor 211 to the base of the transistor 201. The emitter of the transistor 201 supplies power to a line 212 when the transistor 201 is conducting. The movable contact of the potentiometer 205 is connected through a diode 215 to the negative input terminal of an integrated circuit comparator 216. The negative terminal of the comparator 216 is also connected to ground through a resistor 217 and a parallel connected capacitor 218. The positive input terminal of the comparator 216 is connected through a resistor 220 to the output terminal thereof and through a resistor 221 to the junction of the resistors 46 and 47 connected to the regulator 42. The output terminal of the comparator 216 is connected directly to the negative input terminal of a second integrated circuit comparator 225. The negative input terminal of the comparator 225 is also connected through 3 series connected resistors 226, 227 and 228 to the terminal 19 of the battery housing 10', which connects through the thermistor 13 to ground. The junction of the resistors 226 and 227 is connected to ground through a resistor 229 and the junction of the resistors 227 and 228 is connected to the power line 212 through a resistor 230. The positive input terminal of the comparator 225 is connected to the terminal 19 of the battery housing 10' through a resistor 231. The positive input terminal is also connected to the output terminal of the comparator 225 through a resistor 232. The output terminal of the comparator 225 is connected through a resistor 233 to the power line 212 and through a pair of series connected resistors 234 and 235 to the base of a pnp type transistor 236. The junction of the two resistors 234 and 235 is connected to the power line 212 through a capacitor 237. A third integrated circuit comparator 240 has a negative input lead connected to the terminal 40, which in turn is connected to the terminal 18 of the housing 10' and to ground through the internal resistor 14. The comparator 240 further has a positive input terminal which is connected to ground through a resistor 241 and through a pair of parallel connected resistors 242 and 243 to the junction between the resistors 46 and 47 connected to the regulator 42. The output of the comparator 240 is connected directly to the base of an npn type transistor 245 and through a resistor 246 to the power line 212. The emitter of the transistor 236 is connected directly to the power line 212 and to the collector of the transistor 236 through a capacitor 248.

The collector of the transistor 236 is connected through a resistor 247 to the base of an npn type transistor 250. the base of the transistor 250 is also connected through a zener diode 251 to ground. The collector of the transistor 250 is connected directly to the base of the transistor 22. The emitter of the transistor 250 is connected through a resistor 252 to ground and through a resistor 253 to the collector of the transistor 245. The collector of the transistor 236 is connected through a capacitor 255 to a negative input terminal of a fourth integrated circuit comparator 256. The negative input terminal of the comparator 256 is also connected to ground through a parallel combination of a resistor 257 and a diode 258 and is further connected to the power line 212 through a resistor 259. A positive input terminal of the comparator 256 is connected to ground through a parallel combination of a resistor 260 and a diode 261 and to the output terminal thereof through a capacitor 262. The output terminal of the comparator 256 is connected to the power line 212 through a pair of series connected resistors 265 and 266, the junction of which is connected to ground through a capcitor 267. The output terminal of the comparator 256 is also connected through a resistor 270 to the gate of a silicon controlled rectifier 271. The anode of the silicon controlled rectifier 271 is connected directly to the power line 212 and the cathode is connected to a terminal 272. The gate of the silicon controlled rectifier 271 is also connected through a resistor 273 to ground and through a capacitor 274 to the terminal 272. The terminal 272 is further connected through a resistor 275 to ground and through a diode 276 to the positive input terminal of the comparator 225. A light emitting diode 280, which in this embodiment is a green LED, is connected between the terminal 272 and a second terminal 282. The terminal 282 is also connected through a resistor 283 to ground and to a second light emitting diode 285, which in this embodiment is a red LED. The light emitting diode 285 is connected through three series connected diodes 286, 287 and 288 to the power line 212.

In the operation of the circuit illustrated in FIG. 4, when the battery housing 10' is connected into the circuit, for example by plugging into the receptacle 28, three things happen simultaneously. The transistors 201 and 203 turn on supplying power to the power line 212, which energizes the light emitting diode 285, and power is supplied to the four integrated circuit comparators 216, 225, 240 and 256. Second, the comparator 225 senses the presence of a thermistor in the battery housing 10' and, if thermistor 13 is present, the comparator 225 switches from a high at the output thereof to a low or ground potential. When the output of the comparator 225 is near ground potential the transistor 236 is switched on, which produces a potential across the zener diode 251 to turn on the transistor 250. The transistor 250 and resistor 252 are connected in parallel with the regulator 42 to increase the current flowing through the resistors 41a and 41b to increase the bias on the transistor 22. Increasing the bias on the transistor 22 increases the conduction thereof and supplies a greater charging current to the battery 12.

The third step to occur with the insertion of the battery housing 10' into the circuit is the sensing by the comparator 240 of the capacity of the battery 12 in the housing 10'. The present circuit is constructed to receive two variations of batteries, a 700 MAH (milliamps per hour) capacity battery and a 1250 MAH capacity battery, although it should be understood that the circuit might be modified to accept any number. If the battery 12 is a 700 MAH the resistor 14 in the housing 10' is 1.2 K ohms and the potential on the negative input terminal of the comparator 240 is greater than that on the positive terminal so that the output is a logical zero or nearly ground potential. Thus, the transistor 245 is off and the transistor 250 and resistor 252 in parallel with the regulator 42 cause a charging current of approximately 840 milliamperes to flow into the battery 12. If the battery 12 is a 1250 MAH capacity battery the resistor 14 has a value of 390 ohms and the output of the comparator 240 is high, due to the greater voltage drop across resistor 29, which causes the transistor 245 to conduct. With the transistor 245 conducting additional current is drawn through the resistors 41a and 41b to add even more bias to the transistor 22 and supply approximately 1.4 amperes of charging current to the battery 12.

When the charge on the battery 12 is low the resistance value of the thermistor 13 is below 800 ohms. As the battery 12 approaches a full charge the resistance value of the thermistor 13 increases and when the resistance value reaches approximately 1,000 ohms, which is determined to be the value when the battery 12 is approximately fully charged, the comparator 225 switches to a low at the output thereof turning off the transistor 236. When the transistor 236 turns off the transistors 250 and 245 are turned off reducing the bias on the transistor 22 and, therefore, reducing the charging current supplied to the battery 12 to the normal charging current dictated by the regulator 42 and the size of the resistor 14. Simultaneously, when the transistor 236 turns off a negative going pulse is developed at the collector which is supplied through the capacitor 255 to the negative input terminal of the comparator 256. The comparator 256 operates similar to a schmitt trigger and supplies a momentary positive pulse to the gate of the silicon controlled rectifier 271 to turn on the rectifier. Once the silicon controlled rectifier 271 fires it remains on as long as power is supplied to the power line 212. Further, when the silicon controlled rectifier 271 is on, the light emitting diode 280 is activated and the light emitting diode 285 is starved so that it is turned off. When the battery housing 10' is removed from the circuit the transistor 201 is turned off removing power from the line 212 and turning off the silicon controlled rectifier 271. When the next battery housing is inserted in the circuit the silicon controlled rectifier 271 remains off until a pulse is produced by the comparator 256 in response to the negative going pulse produced on the collector of the transistor 236 by the turning off of that transistor upon the battery attaining full charge.

Thus, battery charging apparatus is disclosed which is capable of supplying charging current to a variety of different capacity batteries requiring different optimum charging rates. Further, the charging current can be supplied for any desired period of time or for a predetermined period of time through the use of the improved automatic timer. In addition, a rapid charge can be supplied to a variety of different batteries and the rapid charge is automatically removed when the battery approaches full charge and a predetermined current approximating the optimum charging current for that battery is then applied as long as desired. Both the rapid charging circuitry and the improved timer utilize four IC comparators to provide the improved and simplified circuitry. Further, an indicator is provided which has substantially fewer components than any prior art indicator and which indicates when the battery is charging as well as when the charge cycle is completed. While I have shown and described several specific embodiments of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A battery charging system having a charging path for charging batteries having a variety of different capacities requiring different optimum charging rates, said system including in combination,
    a charging rate sensing circuit, at least one battery cell having an optimum charging rate,
    a fixed resistor related to a predetermined charging rate of said cell approximating the optimum charging rate thereof, and
    battery terminals connected to said cell and to said fixed resistor to form a battery for connecting the battery into the battery charging system with only said cell in said charging path and said fixed resistor in said charging rate sensing circuit.

2. A battery charging system for charging batteries having a variety of different capacities requiring different optimum charging rates, said system including in combinaton,
    a battery including at least one cell, an electrical element having a fixed characteristic related to a predetermined charging rate of said cell approximating the optimum charging rate, and battery terminals connected to said cell and to said electrical element,
    connector means for making electrical connections to the terminals of said battery,
    circuit means connected to said connector means for connection through said terminals of said battery to said electrical element thereof, said circuit means producing a control voltage having a value related to the characteristic of said electrical element,
    charging current supply means connected to said connector means for connection to said cell through said terminals, said current supply means including control means for controlling the charging current supplied thereby in accordance with a control voltage applied thereto,
    and means connecting said circuit means to said control means for applying the control voltage to said control means and controlling the charging current supplied to said cell to the predetermined charging rate of said cell.

3. Battery charging apparatus as claimed in claim 2 wherein the electrical element is a fixed resistor.

4. Battery charging apparatus in accordance with claim 3 wherein said circuit means includes resistance means and means coupled to the resistor associated with the battery for applying current through said resistance means having a value related to the value of the resistor, whereby a control voltage is developed across said resistance means having a value related to the value of the resistor.

5. Battery charging apparatus in accordance with claim 4 wherein said means for applying current to said resistance means includes an integrated circuit regulator having a control terminal, and including a circuit connecting said control terminal to said connector means for connection to the resistor provided as a component of the battery.

6. Battery charging apparatus in accordance with claim 5 wherein said means for applying current through said resistance means includes a transistor having base, emitter and collector electrodes, and reference means applying a reference voltage to said base electrode, with said collector electrode connected to said resistance means, and said emitter electrode connected to said connector means for connection to the resistor provided as a component of the battery.

7. Battery charging apparatus for charging batteries having a variety of different capacities requiring different optimum charging rates, and wherein each battery includes therewith an electrical element having a fixed characteristic related to a predetermined charging rate of the battery approximating the optimum charging rate, and terminals connected to the battery and to the electrical element, such apparatus including in combination;
    connector means for making electrical connections to the terminals of a battery,
    circuit means connected to said connector means for connection through the terminals of the battery to the electrical element thereof, said circuit means producing a control voltage having a value related to the characteristic of the electrical element,
    charging current supply means connected to said connector means for connection to the battery through the terminals thereof, said current supply means including control means for controlling the charging current supplied thereby in accordance with a control voltage applied thereto, said charging current supply means including a transistor having an emitter-collector path for controlling the current supplied to said connector means for charging the battery, and a base electrode connected to said resistance means, whereby the voltage developed across said resistance means controls the conduction of said transistor,
    and means connecting said circuit means to said control means for applying said control voltage to said control means and controlling the charging current supplied to the battery to the predetermined charging rate of the battery.

8. Battery charging apparatus in accordance with claim 7 including a diode connected in the circuit including said emitter-collector path of said transistor and said connector means for supplying charging current to the battery, switch means connected to said diode, and indicator means connected to said switch means, said switch means being rendered operative by the voltage across said diode when charging current is supplied therethrough to operate said indicator means.

9. Battery charging apparatus in accordance with claim 8 wherein said switch means is a transistor having a base-emitter junction connected across said diode, and said indicator means is a light emitting diode connected to the collector electrode of said transistor.

10. Battery charging apparatus for charging batteries having a variety of different capacities requiring different optimum charging rates, and wherein each battery includes therewith an electrical element having a fixed characteristic related to a predetermined charging rate of the battery approximating the optimum charging rate, and terminals connected to the battery and to the electrical element, such apparatus including in combination,
    connector means for making electrical connections to the terminals of a battery,
    circuit means connected to said connector means for connection through the terminals of the battery to the electrical element thereof, said circuit means producing a control voltage having a value related to the characteristic of the electrical element,
    charging current supply means connected to said connector means for connection to the battery through the terminals thereof, said current supply means including control means for controlling the charging current supplied thereby in accordance with a control voltage applied thereto,
    means connecting said circuit means to said control means for applying said control voltage to said control means and controlling the charging current supplied to the battery to the predetermined charging rate of the battery,
    and automatic timing means connected to said circuit means and said control means for substantially reducing the charging current supplied to the battery a predetermined time after charging current is initially applied to the battery.

11. Battery charging apparatus as claimed in claim 10 wherein the automatic timing means includes a plurality of integrated circuit comparators and a coulometer, said comparators being connected in circuit with said coulometer for causing initial current to flow through said coulometer when charging current is applied to the battery, said coulometer charging resistance after a predetermined period of time and causing said comparators to reverse the direction of current through said coulometer and reduce the charging current supplied to the battery.

12. Battery charging apparatus as claimed in claim 11 wherein the automatic timing means includes circuitry providing a reverse current through said coulometer substantially greater than the initial current flowing therethrough for preparing the charging apparatus for the next charge in a time substantially shorter than the predetermined period.

13. Battery charging apparatus as claimed in claim 10 including in addition circuitry connected to said charging current supply means and said automatic timing means for reducing the current supplied to the battery to a trickle charging current at the predetermined time after charging current is initially applied to the battery.

14. Battery charging apparatus for charging batteries having a variety of different capacities requiring different optimum charging rates, and wherein each battery includes therewith an electrical element having a fixed characteristic related to a predetermined charging rate of the battery approximating the optimum charging rate, and terminals connected to the battery and to the electrical element, such apparatus including in combination,
    connector means for making electrical connections to the terminals of a battery,
    circuit means connected to said connector means for connection through the terminals of the battery to the electrical element thereof, said circuit means producing a control voltage having a value related to the characteristic of the electrical element,
    charging current supply means connected to said connector means for connection to the battery through the terminals thereof, said current supply means including control means for controlling the charging current supplied thereby in accordance with a control voltage applied thereto, means connecting said circuit means to said control means for applying said control voltage to said control means and controlling the charging current supplied to the battery to the predetermined charging rate of the battery, and circuitry for supplying a rapid charging rate current to batteries including therewith a temperature sensitive electrical element connected to the terminals thereof and varying in resistance in accordance with changes of temperature of the battery, said circuitry comprising, a rapid rate detector connected to said connector means for connection through the terminals of the battery to the temperature sensitive electrical element thereof, and switch means connected to said rapid rate detector, said rapid rate detector sensing the presence of the temparature sensitive electrical element and the resistance value thereof and activating said switch when the resistance value is within a predetermined range, and said switch means being connected to the control means of said charging current supply means for controlling said supply means to supply to the battery a rapid charging rate current during activation of said switch means.

15. Battery charging apparatus as claimed in claim 14 including in addition delay means connected to said connector means for connection through the terminals to the battery, said delay means being further connected to said rapid rate detector for maintaining said detector inactive for a predetermined period of time after said connector means are attached to the terminals of a battery.

16. Battery charging apparatus as claimed in claim 15 wherein said delay means further includes overvoltage comparator circuitry for maintaining said detector inactive when the battery voltage is above a predetermined value.

17. Battery charging apparatus as claimed in claim 16 including in addition a charge complete detector connected to said switch and providing an output signal when said switch is deactivated by the resistance of said temperature sensitive electrical element exceeding the predetermined range, and locking means connected to said charge complete detector and said rapid rate detector for preventing said rapid rate detector from activating said switch after said locking means receives an output signal from said charge complete detector, and said locking means further being reset by the removal of the battery and the insertion of a new battery in the connector means.

18. Battery charging apparatus as claimed in claim 17 wherein the locking means includes a silicon controlled rectifier.

19. Battery charging apparatus as claimed in claim 17 wherein the rapid rate detector, the delay means, and the charge complete detector each include an integrated circuit comparator.

20. Battery charging apparatus as claimed in claim 18 including in addition an indicator having first and second light emitting diodes, said second light emitting diode being coupled in series with said silicon controlled rectifier and said first light emitting diode being coupled in parallel with said second light emitting diode and said silicon controlled rectifier, said first light emitting diode being further coupled to said charging current supply means for being activated with the application of a charging current to the battery, and the second light emitting diode being activated by conduction of said silicon controlled rectifier and the first light emitting diode being deactivated thereby.

* * * * *